United States Patent [19]

Joffe et al.

[11] Patent Number: 5,014,307

[45] Date of Patent: May 7, 1991

[54] METHOD AND APPARATUS FOR ECHO CANCELER DISABLEMENT

[75] Inventors: Daniel M. Joffe, North Plainfield; Charles R. Eberle, Jr., Rockaway, both of N.J.

[73] Assignee: Integrated Network Corporation, Bridgewater, N.J.

[21] Appl. No.: 436,485

[22] Filed: Nov. 14, 1989

Related U.S. Application Data

[63] Continuation-in-part of Ser. No. 373,895, Jun. 29, 1989.

[51] Int. Cl.⁵ .............................................. H04M 1/00
[52] U.S. Cl. .................................... 379/410; 379/406; 370/32.1
[58] Field of Search ................. 379/408, 406, 410, 93, 379/97, 411, 102, 103, 104, 105; 370/32, 32.1, 110.1, 110.2, 100; 375/40, 106, 108; 340/825.58

[56] References Cited

U.S. PATENT DOCUMENTS 4,658,420 4/1987 Fukushi et al. ..................... 379/407
4,881,221 11/1989 Schroeder et al. ................ 370/32.1

OTHER PUBLICATIONS

Telephony's Dictionary, Telephony Publishing Corp., Chicago, Illinois, pp. 1 and 199, Copyright 1986.

Primary Examiner—Jin F. Ng
Assistant Examiner—Jhancy Augustus
Attorney, Agent, or Firm—Hamilton, Brook, Smith & Reynolds

[57] ABSTRACT

An echo canceler is disabled by sending two signals to it or in the alternate, by sending a single signal. The two signals are bit shifted replicas of each other. The nature of the sequence of the bits within the signals assures that one of the two signals or in the alternate case, a single signal will disable the echo canceler. All of these signals are not necessarily comprised solely of tone at a predetermined frequency; rather they may merely have sufficient energy at a disabling frequency and sufficient signal noise ratio to disable the echo cancelers.

36 Claims, 2 Drawing Sheets

— = SUFFICIENT TO DISABLE

BIT SHIFTS PROCEED IN CLOCKWISE ORDER

Fig. 3

METHOD AND APPARATUS FOR ECHO CANCELER DISABLEMENT

RELATED APPLICATIONS

This application is a continuation-in-part of pending U.S. Pat. application, "METHOD AND APPARATUS FOR ECHO CANCELER DISABLEMENT", by Joffe, Ser. No. 07/373,895, filed on June 29, 1989.

BACKGROUND OF THE INVENTION

Telephone networks implemented with digital facilities can provide both POTS (Plain Old Telephone Service") voiced transmission service and switched 56 kilobits per second (Kbps) data transmission service. The primary difference between the two services is that POTS is primarily used for carrying speech signals and 56 Kbps is primarily used for carrying data signals. Whatever service is selected by a user, it is provided within a single network. For more information on the fundamentals of 56 Kpbs service see A.T.& T. Technical Publication 41458.

Long distance voice calls on POTS telephone circuits require the use of echo cancelers. The echo cancelers remove extraneous echoes that corrupt speech being transmitted over the long distance telephone circuits. However, when switched 56 kilobits per second applications are employed in such POTS telephone circuits, the echo cancelers corrupt the data. As a result, it is desirable for the echo cancelers to be disabled when 56 Kbps service is used. Echo cancelers were originally designed for analog systems and, hence, were designed so that they are disabled upon receiving an analog tone having a frequency of 2100 Hz. With the advent of digitized data systems in which all information was digitized for transmission, the 2100 Hz tone was replicated in digital format by sampling the 2100 Hz analog waveform and generating a stream of digital words, or bytes, representing the wave amplitude at the sampled points. This system works well when the receiver is synchronized with the transmitter, so that each byte is properly framed by the receiver.

Unfortunately, in many instances, the receiver is not synchronized with the transmitter and thus, the echo cancelers cannot be disabled simply by sending a data stream encoding a 2100 Hz tone. A typical environment in which such synchronization is lacking is a 56 Kbps network. In 56 Kbps networks, there are no predetermined byte boundaries; rather data is transmitted as a sequential data stream. As a result, what originates from the 56 Kbps network as a 2100 Hz tone may actually be interpreted as an entirely different tone when it is received and framed at the echo cancelers.

The portion of the telephone network where the echo cancelers reside requires framing of byte boundaries. Since the 2100 Hz tone sent from the remote location lacks byte boundaries, the telephone network attempts to remedy the problem by randomly framing byte boundaries in the sequential data stream. However, since the transmission of the data bits is not synchronized with the framing it cannot be known how the incoming data will be framed as bytes. Because of this inability to know how the data bits will be framed, the transmission of a single version of a digitally encoded 2100 Hz tone is not guaranteed to disable the echo canceler One means of overcoming the framing problem is to send all seven possible framings (sometimes referred to as "rotations") of the digitized 2100 Hz tone. Seven rotations are certain to cover all the possible framings. A typical example of this approach is discussed in the U.S. Pat. application "METHOD AND APPARATUS FOR TRANSMITTING DATA" Ser. No. 07/210,728 by Schroeder et al. In that patent application, a strategy is disclosed wherein seven digitally encoded rotations of a 2100 Hz tone are stored sequentially in memory. Each rotation is identical to its predecessor except that it is shifted by a single bit relative to its predecessor. The seven rotations are stored in memory corresponding to each possible configuration that each byte of data could assume. These rotations are read out of memory in order and sent to the echo cancelers.

Another approach that accounts for all possible byte framings is disclosed in parent pending U.S. Pat. application, "METHOD AND APPARATUS FOR ECHO CANCELER DISABLEMENT," by Joffe, Ser. No. 07/373,895.

These approaches all send a digitized version of 2100 Hz tone in sufficient bit shifted variations, or rotations, such that at least one such variation will be properly framed at the receiver. This requires use of an undesirable relatively large amount of transmission time. In the former case each rotation is sent for a duration of 0.50 seconds resulting in a total transmission time of 3.5 seconds. In the latter case, each rotation is sent for 0.45 seconds resulting in a total transmission time of 3.15 seconds.

SUMMARY OF THE INVENTION

The present invention, however, takes a different approach. It does not always provide an exact digitized 2100 Hz tone; rather, it provides a digitized tone which, no matter how formatted at the receiver, will have enough energy sufficiently near the 2100 Hz tone to disable the echo canceler.

In a first embodiment of the invention, a first signal comprised of plurality of bits is sent to the echo canceler apparatus from a remote access point. Subsequently, a second signal, distinct from the first, is sent to the echo canceler apparatus from the same remote access point. The second signal is a bit shifted replica of the first signal. The nature of the sequence of bits in the first signal and the second signal guarantee that no matter how formatted at the echo canceler, one of the two signals will have sufficient energy at a predetermined disabling frequency to disable the echo canceler apparatus.

The first signal and the second signal may contain non-negligible energy at frequencies other than the disabling frequency of the echo canceler apparatus. As such, it is not necessary for the signals to be comprised solely of the predetermined frequency and thus, fewer signals need to be sent to disable an echo canceler The signals may be sent in a 56 kilobits per second data stream. Furthermore, the signals may be comprised of either Mu-law encoded samples or A-law encoded samples. The first signal may be bit shifted relative to the second signal by either 3 or 4 bits. Either of the bit shifts is sufficient to disable currently available echo cancelers.

The device for disabling the echo canceler is comprised of a tone generator that generates the two signals. A memory is also included for storing samples that are used to generate the first and the second tones. To generate the first signal and the second signal, the samples are read in the same order, but are read with different starting bits to institute a bit shift (e.g. 4 bit shift) between the two signals. Lastly, combinatorial control logic circuitry is employed in communication with the memory so as to address the memory. The samples retrieved from the memory are used to generate the first and the second signals. The control circuitry could be comprised of counters and address selectors. Likewise the memory may be an EPROM.

In an alternative embodiment, only one version of a digitized tone signal is transmitted to the echo canceler. This signal, no matter how framed at the receiver, has sufficient energy content in the vicinity of 2100 Hz to disable the echo canceler. Preferably, this signal is comprised of nineteen samples of 5 cycles of a sinusoid waveform, sampled every 125 microseconds. The frequency of the sampled waveform is the number of cycles divided by time, or 5 cycles / $(19 \times 125$ microseconds$)=2105.2$ Hz.

In accordance with this second preferred embodiment, only a single signal is forwarded to disable the echo cancelers. This signal is generated using the previously described hardware in a manner akin to that previously described for transmitting two distinct disabling signals. The primary difference of this second approach with respect to the first approach is that the second approach employs a different bit pattern.

DETAILED DESCRIPTION OF THE PREFERRED EMBODIMENT

The preferred embodiment of the present invention concerns a method and apparatus for disabling echo cancelers from a remote access point. In accordance with the present invention, it is not necessary that the signal sent to the echo canceler be comprised solely of 2100 Hz tone; rather the signal may fall within a range of frequencies near 2100 Hz that comprise a margin of error. If a signal falls within this margin of error, the signal still disables the echo canceler assuming a sufficient signal to noise ratio. Moreover, the signal need not be comprised solely of tone near 2100 Hz; rather, it need only have significant energy near 2100 Hz and have a sufficient signal to noise ratio.

In light of these characteristics, a first embodiment of the system of the present invention sends two distinct signals that have non-negligible energy at frequencies other than 2100 Hz as opposed to sending a single signal having almost all of its energy at 2100 Hz. One of the two distinct signals, nevertheless, has significant energy near 2100 Hz. The advantages of this approach will become more apparent in the discussion below.

Figure 1:
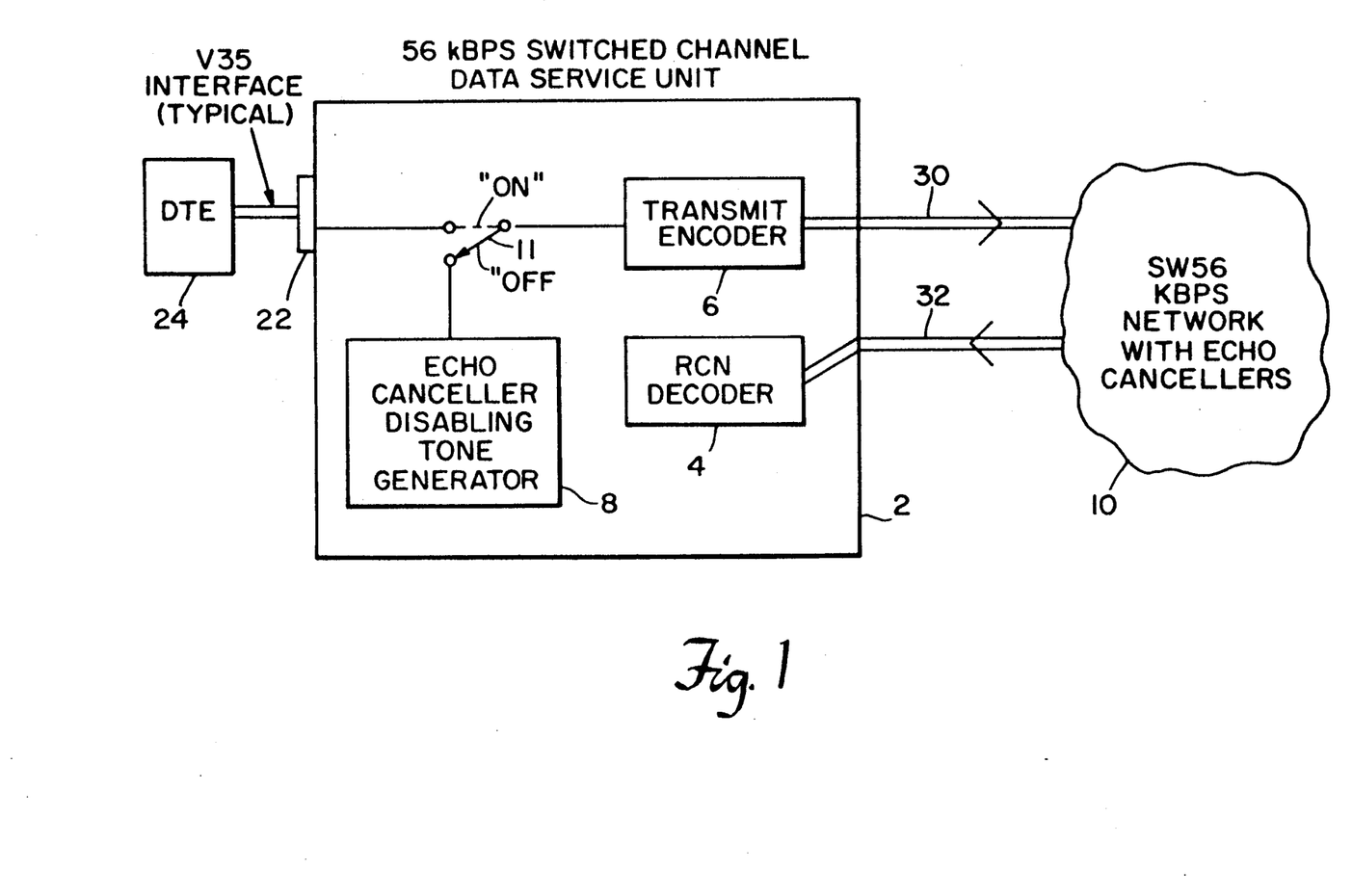
FIG. 1 illustrates a switched channel data service unit in the context of a telephone network.

In a first preferred embodiment two distinct signals representing bit shifted versions of Mu-law encoded digital signal representing tones having predominant energy at 2105.26 Hz are sent by a tone generator 8 situated in a switched channel data service unit 2. The signals are sent to the echo cancelers which are in a switched 56 Kbps telephone network 10. When the signals are received by the appropriate echo cancelers, the echo cancelers are disabled. The disablement allows for uncorrupted switched 56 Kbps telephone network service. Once the echo cancelers are effectively disabled, data may be transmitted over the telephone circuit without fear of corruption.

The 56 Kbps switched channel data service unit 2 is situated between the data terminal equipment 24 and a switched 56 Kbps network 10 having echo cancelers. The network 10 lacks analog access and byte alignment. A number of different data channels including a 64 Kbps DS-0 channel are within the network 10. The data terminal equipment 24 is interfaced to the service unit 2 via a standard interface 22. The interface complies with the CCITT V.35 standard (see A.T.& T. Technical Publication 41450 or the CCITT "Red Book" (1984)). The data service unit 2 includes a transmit encoder 6 and a receiving decoder 4. These units are used to encode data transmitted to the switched 56 Kbps network 10 and to decode data received from said network 10, respectively.

The data service unit 2 also contains a tone generator 8. A switch 11 may be switched to the "ON" position to allow data to flow directly from the data terminal equipment 24 to the transmit encoder 6. If switched to the "OFF" position, the digital bytes of the two signals flow, instead, from the tone generator 8. The switch is implemented using known digital logic circuitry, and is under the control of the switched channel data service unit 2.

When switched 56 Kbps service is desired, the switch 11 is set to the "OFF" position so that it allows the two signals generated by the tone generator 8 to be coupled to the transmit encoder 6. The signals are then appropriately encoded, and coupled via transmission line 30 to the network 10 wherein one of the signals disables the echo cancelers.

Once the echo cancelers are disabled, the telephone circuit is ready to transmit data. Typically, data is generated from the data terminal equipment 24. The switch 11 is set "ON" so that data flows from the data terminal equipment 24 to the transmit encoder 6. It is subsequently sent on to the network. At the same time that this data is being transmitted, additional data can be received from the network 10 at the receiving decoder 4 over transmission line 32.

Figure 2:
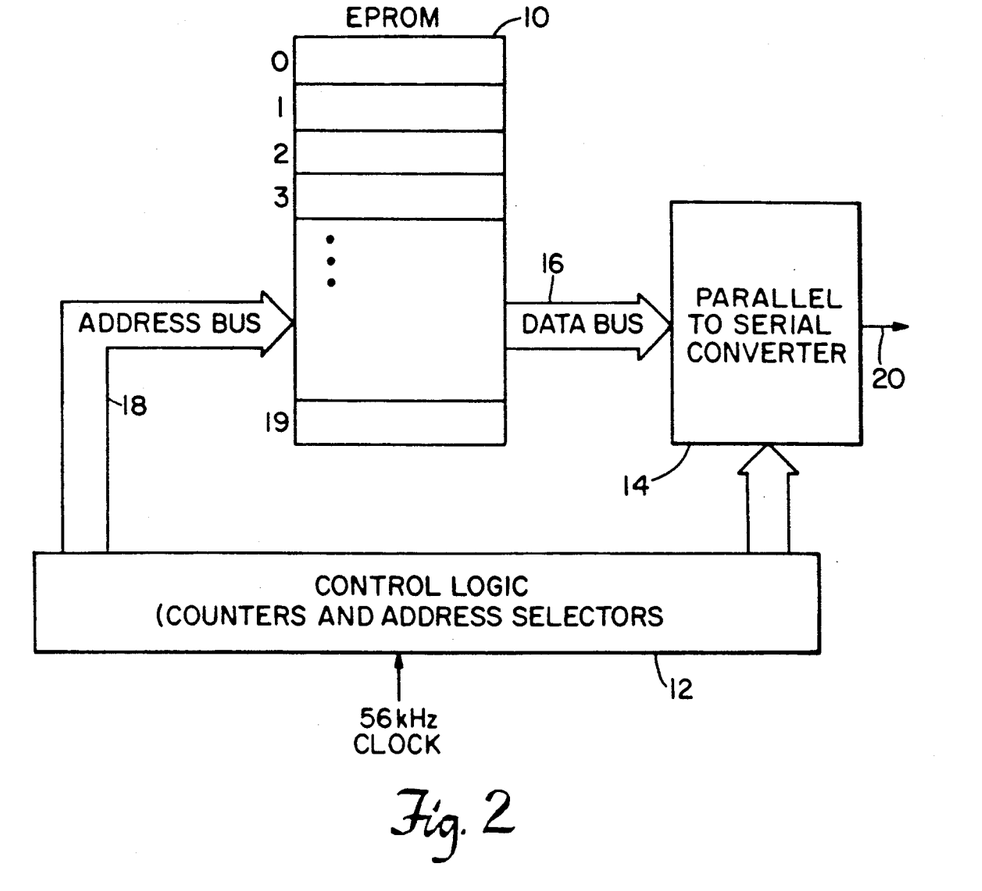
FIG. 2 illustrates the echo canceler disabling tone generator.

FIG. 2 shows the tone generator 8 in more detail. The major components are all currently commercially available. The generator 8 consists of a memory preferably comprised of an EPROM 10 and control logic 12 that generates addresses for the EPROM 10. In the preferred embodiment, the control logic 12 is comprised solely of counters and address selectors. The control logic 12 is clocked by a 56 kilohertz clock signal. The clock signal is slaved from the timing signals of the 56 Kbps network.

The control logic 12 and EPROM 10 are connected via an address bus 18. The address bus 18 carries addresses generated by the control logic 12 to the EPROM 10. These addresses are used to retrieve digital bytes from the EPROM 10. The control logic 12 can specify the order in which bits are read out of the EPROM 6. Data retrieved from the EEPROM 10 is output in parallel to a data bus 16. This parallel output is then converted to serial output via a parallel to serial converter 14. The serial output is subsequently forwarded as a data stream 20 to the network 10.

The EPROM 10 stores digital bytes of seven bits in length. Specifically, the EPROM 10 stores multiple repetitions of nineteen Mu-law encoded bytes. These bytes represent a signal having significant energy at 2105.26 Hz tone. The exact pattern will be discussed in more detail below.

To generate the signals, the generator 8 must first be enabled. The generator is preferably enabled by firmware within the data service unit 2. The switch 11 is then switched to the "ON" position, and the control logic 12 generates addresses to sequentially access the nineteen samples stored in the EPROM 10. The control logic 12 does this by using counters and address selectors. The address selectors select the sample to be accessed, and the counters specify the bits in the sample to be read. During each clock cycle the counters are incremented, and in some instances, the address selectors are also incremented. Thus, for instance, if the counters and address selectors start off equal to zero, the counters and address selectors are incremented to 1 during the first clock cycle. The address selectors then select the first bit in the first address of the EPROM. When the next clock cycle of the 56 kilohertz clock signal arrives, the counters are again incremented so that they have a value of two, but the address selectors maintain their value of one. As a result, the second bit in the first address of the EPROM 10 is read. This process is repeated until all the bits of the memory location specified by the address selectors have been addressed in order. The address selectors are then incremented to indicate the next memory location. When the counters are next incremented, the first bit of the next address is selected, and the process is repeated for this next address. These steps are reiterated until all the address locations have been selected.

The addresses generated by the control logic 12 pass via the address bus 18 to the EPROM 10. The memory location in the EPROM 10 corresponding to the specific address transmitted over the address bus 18 empties its contents in parallel to a data bus 16. The data then travels over the data bus 16 to a parallel to serial converter 14 where it is converted into a serial format. The data subsequently travels as a 56 Kbps data stream to the transmit encoder 6.

In the present embodiment, two distinct disabling signals are sent to the echo cancelers. These signals are generated from nineteen samples comprising five cycles of an analog waveform. These samples are taken at 125 microseconds iterations resulting in a 2105 Hz sample frequency. The nineteen samples represent in digitized form the relative amplitude of the waveform at each sample point converted by Mu-law encoding to take into account the mapping between Mu and linear encoding. Only seven bit digital words are used because the 56 Kbps data stream 20 does not have direct access to all eight bits of the Mu-law encoded signal. The Least Significant Bit (LSB) (bit eight) is used for robbed-bit signaling and is not directly available. Specifically, when sending the disabling tone, it is forced to be a one for an "off hook" signalling indication by the equipment which interfaces the data stream 20 to the telephone network 10 and the echo canceler disabling tone generator 8. When bit 8 is set at zero, it signifies the equivalent of an "on hook" signalling indication. The most significant bit (MSB) (bit one), in contrast, is used as the sign or polarity bit, i.e., High (H) or Low (L).

One complete cycle through the nineteen samples stored in the EPROM 10 generates five cycles of tone. In generating the two distinct signals that are sent to echo cancelers, the system initially generates the first signal by sequentially reading through the nineteen samples a sufficient number of times to generate a signal having a duration of approximately 500 milliseconds. This magnitude of duration is necessary because most current echo cancelers require that a signal have a minimum duration of at least 350 milliseconds to effect disablement. The term signal, hence, refers not to each run through the samples, but rather to the aggregate of such runs through the sample that follow a given bit sequence.

The position number of the first bit that the system reads in each sample as specified by the counters is not theoretically of particular importance. What is important in theory is that each of the bits in the samples are read in sequential order and that the bits of each byte are read in the same order. In other words, it does not matter whether the second bit of a byte or the fifth bit of a byte is read first. As a matter of convention, however, it is probably a good idea to always specify a certain bit position (such as the first bit position) that always is the initial bit read in each byte for generation of the first signal.

Once an order is determined, all bytes must be read in the identical order. Thus, if the first byte is read beginning with the second bit, all other bytes must be read beginning with the second bit. The nineteen samples are then read in the same sequence a sufficient number of times to provide a tone duration of approximately 0.5 seconds. Once the first distinct signal has been sent, the second distinct signal is sent immediately after it.

The second distinct signal is generated in a manner similar to that employed in producing the first signal. Each of the samples is read sequentially and output as a 56 Kbps data stream. The major difference between how this signal is generated and how the first signal is generated rests in the order in which the bits of the samples are read. In generating the second signal, the bits are read starting at a position shifted four bits from the initial position of the first signal. Thus, if bit one was the initial bit read in generating the first signal, bit five would be read first read in generating the second signal. Similarly, if bit seven were the first bit read to generate the first signal, bit four would be the first bit read to generate the second signal. The net effect of this process is to send two signals that are bit shifted relative to each other by four bits. The process is readily implemented by shifting by four bits the bit selection performed by the control logic 12 for the second signal.

In this embodiment, the signals are sent at a level which is well placed in the operating band of the echo canceler disabler. By sending the signals in this range, the generator 8 overcomes distortion attributable to the inability to control bit eight of the byte long samples.

Sending the two distinct signals that are bit shifted relative to each other disables the echo cancelers because of the unique nature of the sequence of samples stored in the EPROM. The sequence has the unusual property that it may be read with at least four different adjacent byte boundaries and still yield sufficient signal to noise ratio to disable an echo canceler. In devising this sequence, it was borne in mind that the first bit in each sample is a sign bit that indicates whether the sample is taken above or below an axis. The remaining bits indicate the amplitude of the sample. Shifting the bits with linear encoding in the amplitude portion produces a change in scale equal to either a multiplication or a division by two. With Mu-law encoding, the level change is of a similar nature, but of a differing amount. Shifting the sign bit, however, may produce more deleterious results. In light of those properties, a sequence was initially devised, that if framed in the same order in which it was sent, would disable the echo canceler. All of the samples in the sequence shared the same sign bit (i.e. the Most Significant Bit). Hence, in order to adequately preserve the sequence for other framings, it had to be certain that the samples would continue to share the same sign bits when framed differently.

This result was achieved by setting the bits at given positions in the samples so that for each sample, those bit positions hold identical values. For instance, in Table 1, positions S4, S2 and Q2 are all identical for each sample. When, the sequence is framed so that these bits are shifted into the sign position, all the sign bits are certain to be the same. As a result, the sign consistency is retained for framings that move these bits into the sign bit. The remaining amplitude bits are configured so that as long as the bits are identical, they constitute a waveform having sufficient energy near 2100 Hz and adequate signal to noise ratio to disable the echo cancelers. This setting of the bits to identical values does not dramatically alter the amplitudes.

As a result, given that there are only seven possible patterns in which signal may be framed, one need only send two signals that are bit shifted by four bits to disable the echo canceler. In particular, this embodiment sends a signal having dominant 2105 Hz energy in digitally encoded form. It should be noted, however, that with this unique sequence the two tones may be shifted by three bits as opposed to 4 bits and still disable the echo canceler. In either case, there is sufficient energy at 2105 Hz to disable the echo canceler. The two signals are each sent for approximately 500 miliseconds constituting a total time of about one second. This timing is set to meet the requirements of the echo canceler disablers currently in service.

Figure 3:
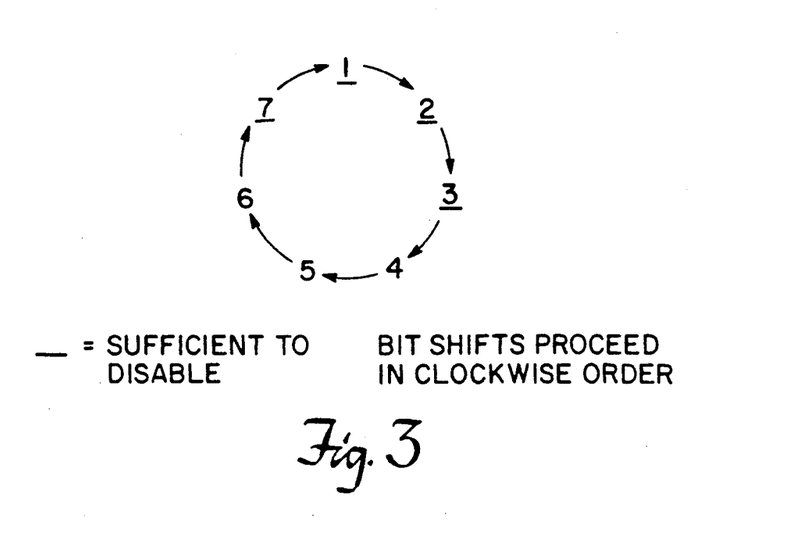
FIG. 3 illustrates the possible framing of the two tones.

FIG. 3 illustrates why a bit offset of four bits or three bits guarantees disablement. Signal one represents the tone resulting when the samples are framed starting with the first bit position; signal two represents the tone produced when the samples are framed from the second bit position, etc. It has been determined in accordance with the invention that signals 1, 2, 3, and 7 all have sufficient energy near 2100 Hz and sufficient signal to the noise ratio to disable the echo canceler. Signals 4, 5, and 6 however, do not have these properties and thus, cannot disable the echo canceler. As can be seen by the illustration in FIG. 3, if a first distinct signal is sent and then a second distinct signal is sent that is shifted four bits relative to the first tone, it is guaranteed that at least one of the two distinct signals sent will be framed so as to have sufficient energy near 2100 Hz and a sufficient signal to noise ratio to disable the echo cancelers.

Tables 1-7 show the associated bits for each of the signal framings. The Tables 1-7 also show the signal to noise ratio and lists the DBMO at given harmonic frequencies present in the received signal. The columns P through Q2 represent the bits in the samples, the column S represents the decimal equivalent of the bits S4, S2 and S1 and the column Q represents the decimal equivalent of bits Q8, Q4 and Q2. The final column denoted X(n) is the equivalent linear representation based on a maximum of 8,159. As can be noted by Tables 1-7 signals 1, 2, 3 and 7 exhibit signal to noise ratios in excess of eleven decibels. This signal to noise ratio is sufficient to disable the echo cancelers.

TABLE 1

| P | S4 | S2 | S1 | Q8 | Q4 | Q2 | S | Q | X(n) |
|---|---|---|---|---|---|---|---|---|---|
| 1 | 1 | 1 | 1 | 1 | 0 | 0 | 7 | 8 | −6239 |
| 1 | 1 | 1 | 1 | 1 | 1 | 0 | 7 | 12 | −7263 |
| 1 | 1 | 1 | 1 | 1 | 0 | 0 | 7 | 8 | −6239 |
| 1 | 1 | 1 | 0 | 1 | 1 | 0 | 6 | 12 | −3615 |
| 1 | 1 | 1 | 1 | 1 | 0 | 0 | 7 | 8 | −6239 |
| 1 | 1 | 1 | 1 | 1 | 1 | 0 | 7 | 12 | −7263 |
| 1 | 1 | 1 | 1 | 0 | 0 | 0 | 7 | 0 | −4191 |
| 1 | 1 | 1 | 0 | 1 | 1 | 0 | 6 | 12 | −3615 |
| 1 | 1 | 1 | 1 | 1 | 1 | 0 | 7 | 12 | −7263 |
| 1 | 1 | 1 | 1 | 1 | 1 | 0 | 7 | 12 | −7263 |
| 1 | 1 | 1 | 1 | 0 | 0 | 0 | 7 | 0 | −4191 |
| 1 | 1 | 1 | 1 | 0 | 0 | 0 | 7 | 0 | −4191 |
| 1 | 1 | 1 | 1 | 1 | 1 | 0 | 7 | 12 | −7263 |
| 1 | 1 | 1 | 1 | 1 | 1 | 0 | 7 | 12 | −7263 |
| 1 | 1 | 1 | 0 | 1 | 1 | 0 | 6 | 12 | −3615 |
| 1 | 1 | 1 | 1 | 0 | 0 | 0 | 7 | 0 | −4191 |
| 1 | 1 | 1 | 1 | 1 | 1 | 0 | 7 | 12 | −7263 |
| 1 | 1 | 1 | 1 | 1 | 0 | 0 | 7 | 8 | −6239 |
| 1 | 1 | 1 | 0 | 1 | 1 | 0 | 6 | 12 | −3615 |

THD = 26.5994    SNR = 11.50256

| FREQ | DBMO |
|---|---|
| 0 | −.2184279 |
| 421.0527 | −38.09232 |
| 842.1053 | −26.46786 |
| 1263.158 | −36.45569 |
| 1684.211 | −25.98157 |
| 2105.263 | −8.806294 |
| 2526.316 | −53.76105 |
| 2947.369 | −27.51487 |
| 3368.421 | −33.34627 |
| 3789.474 | −27.17808 |

TABLE 2

| P | S4 | S2 | S1 | Q8 | Q4 | Q2 | S | Q | X(n) |
|---|---|---|---|---|---|---|---|---|---|
| 1 | 1 | 1 | 1 | 0 | 0 | 1 | 7 | 2 | −4703 |
| 1 | 1 | 1 | 1 | 1 | 0 | 1 | 7 | 10 | −6751 |
| 1 | 1 | 1 | 1 | 0 | 0 | 1 | 7 | 2 | −4703 |
| 1 | 1 | 0 | 1 | 1 | 0 | 1 | 5 | 10 | −1663 |
| 1 | 1 | 1 | 1 | 0 | 0 | 1 | 7 | 2 | −4703 |
| 1 | 1 | 1 | 1 | 1 | 0 | 1 | 7 | 10 | −6751 |
| 1 | 1 | 1 | 0 | 0 | 0 | 1 | 6 | 2 | −2335 |
| 1 | 1 | 0 | 1 | 1 | 0 | 1 | 5 | 10 | −1663 |
| 1 | 1 | 1 | 1 | 1 | 0 | 1 | 7 | 10 | −6751 |
| 1 | 1 | 1 | 1 | 1 | 0 | 1 | 7 | 10 | −6751 |
| 1 | 1 | 1 | 0 | 0 | 0 | 1 | 6 | 2 | −2335 |
| 1 | 1 | 1 | 0 | 0 | 0 | 1 | 6 | 2 | −2335 |
| 1 | 1 | 1 | 1 | 1 | 0 | 1 | 7 | 10 | −6751 |
| 1 | 1 | 1 | 1 | 1 | 0 | 1 | 7 | 10 | −6751 |
| 1 | 1 | 0 | 1 | 1 | 0 | 1 | 5 | 10 | −1663 |
| 1 | 1 | 1 | 0 | 0 | 0 | 1 | 6 | 2 | −2335 |
| 1 | 1 | 1 | 1 | 1 | 0 | 1 | 7 | 10 | −6751 |
| 1 | 1 | 1 | 1 | 0 | 0 | 1 | 7 | 2 | −4703 |
| 1 | 1 | 0 | 1 | 1 | 0 | 1 | 5 | 10 | −1663 |

THD = 22.99241    SNR = 12.76831

| FREQ | DBMO |
|---|---|
| 0 | −2.525072 |
| 421.0527 | −38.99309 |
| 842.1053 | −24.77961 |
| 1263.158 | −29.38648 |
| 1684.211 | −23.27296 |
| 2105.263 | −5.891001 |
| 2526.316 | −42.11368 |
| 2947.369 | −24.1608 |
| 3368.421 | −37.57161 |
| 3789.474 | −36.33489 |

TABLE 3

| P | S4 | S2 | S1 | Q8 | Q4 | Q2 | S | Q | X(n) |
|---|---|---|---|---|---|---|---|---|---|
| 1 | 1 | 1 | 0 | 0 | 1 | 1 | 6 | 6 | −2847 |
| 1 | 1 | 1 | 1 | 0 | 1 | 1 | 7 | 6 | −5727 |
| 1 | 1 | 1 | 0 | 0 | 1 | 1 | 6 | 6 | −2847 |
| 1 | 0 | 1 | 1 | 0 | 1 | 1 | 3 | 6 | −327 |
| 1 | 1 | 1 | 0 | 0 | 1 | 1 | 6 | 6 | −2847 |
| 1 | 1 | 1 | 1 | 0 | 1 | 1 | 7 | 6 | −5727 |
| 1 | 1 | 0 | 0 | 0 | 1 | 1 | 4 | 6 | −687 |

TABLE 3-continued

| P | S4 | S2 | S1 | Q8 | Q4 | Q2 | S | Q | X(n) |
|---|----|----|----|----|----|----|---|---|------|
| 1 | 0 | 1 | 1 | 0 | 1 | 1 | 3 | 6 | −327 |
| 1 | 1 | 1 | 1 | 0 | 1 | 1 | 7 | 6 | −5727 |
| 1 | 1 | 1 | 1 | 0 | 1 | 1 | 7 | 6 | −5727 |
| 1 | 1 | 0 | 0 | 0 | 1 | 1 | 4 | 6 | −687 |
| 1 | 1 | 0 | 0 | 0 | 1 | 1 | 4 | 6 | −687 |
| 1 | 1 | 1 | 1 | 0 | 1 | 1 | 7 | 6 | −5727 |
| 1 | 1 | 1 | 1 | 0 | 1 | 1 | 7 | 6 | −5727 |
| 1 | 0 | 1 | 1 | 0 | 1 | 1 | 3 | 6 | −327 |
| 1 | 1 | 0 | 0 | 0 | 1 | 1 | 4 | 6 | −687 |
| 1 | 1 | 1 | 1 | 0 | 1 | 1 | 7 | 6 | −5727 |
| 1 | 1 | 1 | 0 | 0 | 1 | 1 | 6 | 6 | −2847 |
| 1 | 0 | 1 | 1 | 0 | 1 | 1 | 3 | 6 | −327 |

THD = 26.54938    SNR = 11.51891

| FREQ | DBMO |
|------|------|
| 0 | −5.916792 |
| 421.0527 | −28.73258 |
| 842.1053 | −25.71966 |
| 1263.158 | −25.11515 |
| 1684.211 | −21.5114 |
| 2105.263 | −5.219109 |
| 2526.316 | −34.87041 |
| 2947.369 | −23.03784 |
| 3368.421 | −51.74773 |
| 3789.474 | −27.61031 |

TABLE 4

| P | S4 | S2 | S1 | Q8 | Q4 | Q2 | S | Q | X(n) |
|---|----|----|----|----|----|----|---|---|------|
| 1 | 1 | 0 | 0 | 1 | 1 | 1 | 4 | 14 | −943 |
| 1 | 1 | 1 | 0 | 1 | 1 | 1 | 6 | 14 | −3871 |
| 1 | 1 | 0 | 0 | 1 | 1 | 1 | 4 | 14 | −943 |
| 0 | 1 | 1 | 0 | 1 | 1 | 1 | 6 | 14 | 3871 |
| 1 | 1 | 0 | 0 | 1 | 1 | 1 | 4 | 14 | −943 |
| 1 | 1 | 1 | 0 | 1 | 1 | 1 | 6 | 14 | −3871 |
| 1 | 0 | 0 | 0 | 1 | 1 | 1 | 0 | 14 | −28 |
| 0 | 1 | 1 | 0 | 1 | 1 | 1 | 6 | 14 | 3871 |
| 1 | 1 | 1 | 0 | 1 | 1 | 1 | 6 | 14 | −3871 |
| 1 | 1 | 1 | 0 | 1 | 1 | 1 | 6 | 14 | −3871 |
| 1 | 0 | 0 | 0 | 1 | 1 | 1 | 0 | 14 | −28 |
| 1 | 0 | 0 | 0 | 1 | 1 | 1 | 0 | 14 | −28 |
| 1 | 1 | 1 | 0 | 1 | 1 | 1 | 6 | 14 | −3871 |
| 1 | 1 | 1 | 0 | 1 | 1 | 1 | 6 | 14 | −3871 |
| 0 | 1 | 1 | 0 | 1 | 1 | 1 | 6 | 14 | 3871 |
| 1 | 0 | 0 | 0 | 1 | 1 | 1 | 0 | 14 | −28 |
| 1 | 1 | 1 | 0 | 1 | 1 | 1 | 6 | 14 | −3871 |
| 1 | 1 | 0 | 0 | 1 | 1 | 1 | 4 | 14 | −943 |
| 0 | 1 | 1 | 0 | 1 | 1 | 1 | 6 | 14 | 3871 |

THD = 35.67511    SNR = 8.952694

| FREQ | DBMO |
|------|------|
| 0 | −17.00286 |
| 421.0527 | −18.49566 |
| 842.1053 | −21.29239 |
| 1263.158 | −34.97059 |
| 1684.211 | −22.55219 |
| 2105.263 | −3.605939 |
| 2526.316 | −27.31871 |
| 2947.369 | −22.13006 |
| 3368.421 | −21.75107 |
| 3789.474 | −18.73528 |

TABLE 5

| P | S4 | S2 | S1 | Q8 | Q4 | Q2 | S | Q | X(n) |
|---|----|----|----|----|----|----|---|---|------|
| 1 | 0 | 0 | 1 | 1 | 1 | 1 | 1 | 14 | −89 |
| 1 | 1 | 0 | 1 | 1 | 1 | 1 | 5 | 14 | −1919 |
| 1 | 0 | 0 | 1 | 1 | 1 | 0 | 1 | 12 | −81 |
| 1 | 1 | 0 | 1 | 1 | 1 | 1 | 5 | 14 | −1919 |
| 1 | 0 | 0 | 1 | 1 | 1 | 1 | 1 | 14 | −89 |
| 1 | 1 | 0 | 1 | 1 | 1 | 1 | 5 | 14 | −1919 |
| 0 | 0 | 0 | 1 | 1 | 1 | 0 | 1 | 12 | 81 |
| 1 | 1 | 0 | 1 | 1 | 1 | 1 | 5 | 14 | −1919 |
| 1 | 1 | 0 | 1 | 1 | 1 | 1 | 5 | 14 | −1919 |
| 1 | 1 | 0 | 1 | 1 | 1 | 1 | 5 | 14 | −1919 |
| 0 | 0 | 0 | 1 | 1 | 1 | 1 | 1 | 14 | 89 |
| 0 | 0 | 0 | 1 | 1 | 1 | 1 | 1 | 14 | 89 |
| 1 | 1 | 0 | 1 | 1 | 1 | 1 | 5 | 14 | −1919 |
| 1 | 1 | 0 | 1 | 1 | 1 | 0 | 5 | 12 | −1791 |

TABLE 5-continued

| P | S4 | S2 | S1 | Q8 | Q4 | Q2 | S | Q | X(n) |
|---|----|----|----|----|----|----|---|---|------|
| 1 | 1 | 0 | 1 | 1 | 1 | 1 | 5 | 14 | −1919 |
| 0 | 0 | 0 | 1 | 1 | 1 | 1 | 1 | 14 | 89 |
| 1 | 1 | 0 | 1 | 1 | 1 | 1 | 5 | 14 | −1919 |
| 1 | 0 | 0 | 1 | 1 | 1 | 0 | 1 | 12 | −81 |
| 1 | 1 | 0 | 1 | 1 | 1 | 1 | 5 | 14 | −1919 |

THD = 331.4688    SNR = −10.40885

| FREQ | DBMO |
|------|------|
| 0 | −14.3746 |
| 421.0527 | −33.94579 |
| 842.1053 | −32.766 |
| 1263.158 | −22.61813 |
| 1684.211 | −20.3841 |
| 2105.263 | −23.50753 |
| 2526.316 | −37.79218 |
| 2947.369 | −35.90421 |
| 3368.421 | −37.38364 |
| 3789.474 | −14.83742 |

TABLE 6

| P | S4 | S2 | S1 | Q8 | Q4 | Q2 | S | Q | X(n) |
|---|----|----|----|----|----|----|---|---|------|
| 0 | 0 | 1 | 1 | 1 | 1 | 1 | 3 | 14 | 455 |
| 1 | 0 | 1 | 1 | 1 | 1 | 1 | 3 | 14 | −455 |
| 0 | 0 | 1 | 1 | 1 | 0 | 1 | 3 | 10 | 391 |
| 1 | 0 | 1 | 1 | 1 | 1 | 1 | 3 | 14 | −455 |
| 0 | 0 | 1 | 1 | 1 | 1 | 1 | 3 | 14 | 455 |
| 1 | 0 | 1 | 1 | 1 | 1 | 0 | 3 | 12 | −423 |
| 0 | 0 | 1 | 1 | 1 | 0 | 1 | 3 | 10 | 391 |
| 1 | 0 | 1 | 1 | 1 | 1 | 1 | 3 | 14 | −455 |
| 1 | 0 | 1 | 1 | 1 | 1 | 1 | 3 | 14 | −455 |
| 1 | 0 | 1 | 1 | 1 | 1 | 0 | 3 | 12 | −423 |
| 0 | 0 | 1 | 1 | 1 | 1 | 0 | 3 | 12 | 423 |
| 0 | 0 | 1 | 1 | 1 | 1 | 1 | 3 | 14 | 455 |
| 1 | 0 | 1 | 1 | 1 | 1 | 1 | 3 | 14 | −455 |
| 1 | 0 | 1 | 1 | 1 | 0 | 1 | 3 | 10 | −391 |
| 1 | 0 | 1 | 1 | 1 | 1 | 0 | 3 | 12 | −423 |
| 0 | 0 | 1 | 1 | 1 | 1 | 1 | 3 | 14 | 455 |
| 1 | 0 | 1 | 1 | 1 | 1 | 1 | 3 | 14 | −455 |
| 0 | 0 | 1 | 1 | 1 | 0 | 1 | 3 | 10 | 391 |
| 1 | 0 | 1 | 1 | 1 | 1 | 1 | 3 | 14 | −455 |

THD = 352.8294    SNR = −10.95129

| FREQ | DBMO |
|------|------|
| 0 | −37.70717 |
| 421.0527 | −38.66848 |
| 842.1053 | −39.0394 |
| 1263.158 | −29.41261 |
| 1684.211 | −27.69681 |
| 2105.263 | −30.85979 |
| 2526.316 | −42.79735 |
| 2947.369 | −42.98718 |
| 3368.369 | −52.0288 |
| 3789.474 | −21.54968 |

TABLE 7

| P | S4 | S2 | S1 | Q3 | Q4 | Q2 | S | Q | X(n) |
|---|----|----|----|----|----|----|---|---|------|
| 0 | 1 | 1 | 1 | 1 | 1 | 1 | 7 | 14 | 7775 |
| 0 | 1 | 1 | 1 | 1 | 1 | 0 | 7 | 12 | 7263 |
| 0 | 1 | 1 | 1 | 0 | 1 | 1 | 7 | 6 | 5727 |
| 0 | 1 | 1 | 1 | 1 | 1 | 0 | 7 | 12 | 7263 |
| 0 | 1 | 1 | 1 | 1 | 1 | 1 | 7 | 14 | 7775 |
| 0 | 1 | 1 | 1 | 1 | 0 | 0 | 7 | 8 | 6239 |
| 0 | 1 | 1 | 1 | 0 | 1 | 1 | 7 | 6 | 5727 |
| 0 | 1 | 1 | 1 | 1 | 1 | 1 | 7 | 14 | 7775 |
| 0 | 1 | 1 | 1 | 1 | 1 | 1 | 7 | 14 | 7775 |
| 0 | 1 | 1 | 1 | 1 | 0 | 0 | 7 | 8 | 6239 |
| 0 | 1 | 1 | 1 | 1 | 0 | 0 | 7 | 8 | 6239 |
| 0 | 1 | 1 | 1 | 1 | 1 | 1 | 7 | 14 | 7775 |
| 0 | 1 | 1 | 1 | 1 | 1 | 1 | 7 | 14 | 7775 |
| 0 | 1 | 1 | 1 | 0 | 1 | 1 | 7 | 6 | 5727 |
| 0 | 1 | 1 | 1 | 1 | 0 | 0 | 7 | 8 | 6239 |
| 0 | 1 | 1 | 1 | 1 | 1 | 1 | 7 | 14 | 7775 |
| 0 | 1 | 1 | 1 | 1 | 1 | 0 | 7 | 12 | 7263 |
| 0 | 1 | 1 | 1 | 0 | 1 | 1 | 7 | 6 | 5727 |
| 0 | 1 | 1 | 1 | 1 | 1 | 0 | 7 | 12 | 7263 |

THD = 26.78196    SNR = 11.44315

FREQ    DBMO

TABLE 7-continued

| P | S4 | S2 | S1 | Q3 | Q4 | Q2 | S | Q | X(n) |
|---|----|----|----|----|----|----|---|---|------|
| 0 |    | 1.560187 |  |  |  |  |  |  |  |
| 421.0527 |  | 50.27515 |  |  |  |  |  |  |  |
| 842.1053 |  | −31.2866 |  |  |  |  |  |  |  |
| 1263.158 |  | −50.24183 |  |  |  |  |  |  |  |
| 1684.211 |  | −35.25902 |  |  |  |  |  |  |  |
| 2105.263 |  | −14.12665 |  |  |  |  |  |  |  |
| 2526.316 |  | −79.20141 |  |  |  |  |  |  |  |
| 2947.369 |  | −33.00241 |  |  |  |  |  |  |  |
| 3368.421 |  | −42.8894 |  |  |  |  |  |  |  |
| 3789.474 |  | −29.35261 |  |  |  |  |  |  |  |

With respect to the signal to noise ratio shown in Tables 1–7, it should be noted that they were calculated ignoring the zero frequency components because most echo canceler disabling circuits do not pay attention to the zero frequency DC components. Nevertheless, in certain disabling circuits, these zero frequency components are not ignored and, thus, must be taken into account. In such cases, the bit pattern may be minimally adjusted to set the zero frequency component to an appropriate level.

In accordance with a second preferred embodiment, only a single signal is forwarded to disable the echo cancelers. This signal is generated using the previously described hardware in a manner akin to that elaborated above. The primary differences of this second approach relative to the first approach are that this approach sends only one signal and employs a different bit pattern of nineteen samples. The single signal is generated as follows. Four samples are taken for each of the first four cycles of an analog waveform, and only three samples are taken from the fifth cycle of the analog waveform. Thus, 19 samples (4×4+1×3) are taken comprising 5 cycles leading to a preponderance of 2105 Hz energy. The starting bit pattern is one which intuitively appears, no matter how framed, to produce a sufficiently powerful disabling signal near 2100 Hz. For a 7×19 bit pattern, there are, in general, $s^{133}$ different possible patterns; consequently, it was extremely important to select a promising bit pattern as a starting point. When digitizing a waveform, the first bit, or Most Significant Bit (MSB), is the "sign" bit, which denotes the bit polarity, i.e., High (H), or Low (L).

The sign bit, for the four cycles of waveform in which four samples are taken in this embodiment, is observed to follow an alternating pattern of two high bits followed by two low. The Most Significant Bit for each of the sixteen samples taken from the four cycles have been selected to follow this pattern of one's followed by zero's to generate a Most Significant Bit pattern of sixteen samples as follows: 1100110011001100. The three other Most Significant Bits for the three remaining samples are chosen to have two one's and a zero.

Selecting the Most Significant Bits in this manner also has the advantage of minimizing the zero frequency component by using alternating sign bits. Some echo cancelers are sensitive to excess zero frequency energy. The remaining bits in the pattern are selected such that no matter how the bit stream is framed, the basic two-High-two-Low pattern of the Most Significant Bits is retained for all rotations and the pattern of each byte remains constant, no matter how it is framed, with the exception of the 5th cycle.

the resulting pattern is shown below:

| | SAMPLE | MSB | | | | | | |
|---|---|---|---|---|---|---|---|---|
| 1st Cycle | 1 | 1 | 0 | 1 | 0 | 1 | 0 | 1 |
|  | 2 | 1 | 0 | 1 | 0 | 1 | 0 | 1 |
|  | 3 | 0 | 1 | 0 | 1 | 0 | 1 | 0 |
|  | 4 | 0 | 1 | 0 | 1 | 0 | 1 | 0 |
| 2nd Cycle | 5 | 1 | 0 | 1 | 0 | 1 | 0 | 1 |
|  | 6 | 1 | 0 | 1 | 0 | 1 | 0 | 1 |
|  | 7 | 0 | 1 | 0 | 1 | 0 | 1 | 0 |
|  | 8 | 0 | 1 | 0 | 1 | 0 | 1 | 0 |
| 3rd Cycle | 9 | 1 | 0 | 1 | 0 | 1 | 0 | 1 |
|  | 10 | 1 | 0 | 1 | 0 | 1 | 0 | 1 |
|  | 11 | 0 | 1 | 0 | 1 | 0 | 1 | 0 |
|  | 12 | 0 | 1 | 0 | 1 | 0 | 1 | 0 |
| 4th Cycle | 13 | 1 | 0 | 1 | 0 | 1 | 0 | 1 |
|  | 14 | 1 | 0 | 1 | 0 | 1 | 0 | 1 |
|  | 15 | 0 | 1 | 0 | 1 | 0 | 1 | 0 |
|  | 16 | 0 | 1 | 0 | 1 | 0 | 1 | 0 |
| 5th Cycle | 17 | 1 | 0 | 1 | 0 | 1 | 0 | 1 |
|  | 18 | 1 | 0 | 1 | 0 | 1 | 0 | 1 |
|  | 19 | 0 | 1 | 0 | 1 | 0 | 1 | 0 |

This initial bit pattern is optimized by performing a spectral analysis of the selected pattern in all possible framing conditions, i.e., byte alignments or phase rotations while changing one or two bits in the pattern. Optimization criteria can be selected to match the sensitivity of the echo canceler disabler circuit at the receiver to various harmonics. Specifically, the signaler is adjusted to take into account the weightings given the different frequency components by the disabling circuit. For example, when it is known that the receiver is extremely sensitive to harmonics at frequency F1, a bit pattern which produces a low, but acceptable signal-to-noise ratio (SNR) at 2105 Hz may be chosen over one which has a higher SNR, that produces high levels of F1 harmonics.

To generate the signal, the bits of the nineteen samples are read in sequential order starting with the first bit of each sample. The address selectors and counters are used as previously described. The nineteen samples are read a sufficient number of times to generate a signal having a duration of approximately 0.5 seconds.

As a result of sending tones that do not aim to have all their energy at 2100 Hz, the present invention employs a more efficient strategy than other approaches. In particular, echo cancelers may be disabled by two signals corresponding to 1.0 transmission time or one signal corresponding to 0.5 seconds as opposed to seven rotations corresponding to 3.5 seconds transmission time. Furthermore, the storage requirements for bits is reduced; thus, reducing the cost and complexity.

EQUIVALENTS

While the invention has been particularly shown and described with reference to preferred embodiments thereof, it will be understood by those skilled in the art that various changes in form and details may be made without departing from the spirit and scope of the invention as defined in the appended claims. For example, a serial ROM may be used, rather than the address selectors, counters and EPROM described previously.

We claim:

1. A method of disabling an echo canceler apparatus, locate din a receiver site in which bytes are framed, comprising the step of transmitting a pattern of digital samples of a tone and less than all possible bit-shifted replicas of the pattern to the receiver site from the remote site such that it is certain that at least one of the bit-shifted replicas of the pattern or the pattern itself has sufficient energy near a predetermined disabling frequency to disable the echo canceler regardless of how the transmitted patterns are framed at the receiver site.

2. A method as recited in claim 1 wherein no bit-shifted replica is sent to the receiver site from the remote site.

3. A method as recited in claim 1 wherein only a single bit-shifted replica is sent to the receiver site from the remote site.

4. A method as recited in claim 1 wherein the pattern of digital samples of the tone and the replicas sent from the remote site to the receiver site have non-negligible energy at frequencies other than the predetermined disabling frequency.

5. A method as recited in claim 1 wherein the pattern of digital samples and the bit-shifted replicas are sent to the receiver site as a 56 kilobits per second serial data stream.

6. A telecommunications system comprising:
(a) a byte-synchronous transmission circuit;
(b) an echo canceler including disabling means responsive to a range of frequencies of digitally encoded tones for disabling operation of the echo canceler upon receipt of a digitally encoded tone having sufficient energy in the range of frequencies, said echo canceler including means for framing digitally encoded tones into data frames; and
(c) remote signalling means for transmitting less than three different patterns of samples of digitally encoded tones to the disabling means wherein each pattern is a bit-shifted replica of the other patterns, said remote signalling means comprising means for sequentially transmitting the patterns of samples of digitally encoded tones, and wherein one of the patterns disables the echo canceler no mater how frames at the byte-synchronous digital transmission circuit.

7. A telecommunications system as recited in claim 6 wherein the remote signalling means transmits only a single pattern of samples of a digitally encoded tone.

8. A telecommunications system as recited in claim 6 wherein the remote signalling means transmits two patterns of samples of digitally encoded tones.

9. A method of disabling an echo canceler located in an environment wherein byte boundaries are established comprising sending only a single distinct pattern of digitally encoded samples of a tone to the echo canceler from a remote location wherein byte boundaries are not established, said pattern being configured so that no matter how the pattern is frames it disables the echo canceler.

10. A method as recited in claim 9 wherein the distinct pattern is consists of nineteen digital samples of tone.

11. A method as recited in claim 10 wherein the digitally encoded samples represents 5 cycles of tone.

12. A method as recited in claim 11 wherein 4 digitally encoded samples are taken for the first four cycles of the tone and 3 digitally encoded samples are taken for the fifth cycle of the tone.

13. A method as recited in claim 10 wherein each digitally encoded sample comprises 7 bits.

14. A method of disabling an echo canceler apparatus that is disabled by a signal at a predetermined disabling frequency and signal to noise ratio from a transmitter at a remote location where byte alignment is not available, comprising the steps of:

(a) transmitting a first distance pattern of digitally encoded samples of a tone comprised of a plurality of bits to the echo canceler apparatus from said remote location;
(b) sending a second distinct pattern of digitally encoded samples of a tone to the echo canceler apparatus from the remote location wherein the second pattern is a bit-shifted replica of the first pattern such that due to the sequence of bits i the first pattern and the second pattern, it is certain that one of the two patterns has sufficient energy at the predetermined disabling frequency and a sufficient signal to noise a ratio to disable the echo canceler apparatus when framed into bytes at the receiver.

15. A method as recited in claim 14 wherein the first pattern and the second distinct pattern contain non-negligible energy at frequencies other than the predetermined disabling frequency of the echo canceler apparatus.

16. A method as recited in claim 14 wherein the first pattern and the second distinct pattern are sent to the echo canceler apparatus in a 56 kilobit per second data stream.

17. A method as recited in claim 14 wherein the first pattern and the second distinct pattern are comprised of Mu-law encoded samples.

18. A method as recited in claim 14 wherein the first pattern and the second distinct pattern are comprised of A-law encoded samples.

19. A method as recited in claim 14 wherein the predetermined disabling frequency of the echo canceler is 2105 hertz.

20. A method as recited in claim 14 wherein the second distinct pattern is phase shifted by three bits relative to the first distinct pattern.

21. A method as recited in claim 14 wherein the second distinct pattern is phase shifted by four bits relative to the first pattern.

22. A method as recited in claim 21 wherein all least significant bits of the samples for one of the patterns are identical.

23. A device for disabling an echo canceler that is disabled by a signal at a predetermined frequency and a predetermined signal to noise ratio comprising:
(a) a tone generator for generating two patterns of digitally encoded samples of tones wherein the second pattern is a bit-shifted replica of the first pattern and at least one of the patterns encodes a tone that has sufficient energy at the predetermined disabling frequency to disable the echo canceler;
(b) a memory for storing digitally encoded samples of a tone comprised of bits that are read in different bit sequences to generate the first pattern and the second pattern; and
(c) combinatorial control logic circuitry in communication with the memory for addressing the memory to receive the bits to generate the first pattern and the second pattern.

24. /A device as recited in claim 23 wherein the tone generator generates the first pattern and the second pattern as a mu-law encoded data stream.

25. A device as recited in claim 23 wherein the tone generator generates the first pattern and the second pattern as an A-law encoded data stream.

26. A device as recited in claim 23 wherein the memory is an EPROM.

27. A device as recited in claim 23 wherein the combinatorial control logic circuitry comprises a plurality of counters and address selectors.

28. A device as recited in claim 23 further comprising a switching means in communication with the tone generator that determines whether the patterns generated are forwarded to the echo canceler.

29. A method of disabling an echo canceler located in a receiver site in which bytes are framed, comprising the step of:

(a) sending a first distinct pattern of digitally encoded samples of a tone to the receiver site from an asychronous remote location, said first pattern being comprised of repetitions of nineteen digitally encoded seven bit samples wherein the nineteen samples are:

| | | | | | | |
|---|---|---|---|---|---|---|
| 1 | 1 | 1 | 1 | 1 | 0 | 0 |
| 1 | 1 | 1 | 1 | 1 | 1 | 0 |
| 1 | 1 | 1 | 1 | 1 | 0 | 0 |
| 1 | 1 | 1 | 0 | 1 | 1 | 0 |
| 1 | 1 | 1 | 1 | 1 | 0 | 0 |
| 1 | 1 | 1 | 1 | 1 | 1 | 0 |
| 1 | 1 | 1 | 1 | 0 | 0 | 0 |
| 1 | 1 | 1 | 0 | 1 | 1 | 0 |
| 1 | 1 | 1 | 1 | 1 | 1 | 0 |
| 1 | 1 | 1 | 1 | 0 | 0 | 0 |
| 1 | 1 | 1 | 1 | 0 | 0 | 0 |
| 1 | 1 | 1 | 1 | 1 | 1 | 0 |
| 1 | 1 | 1 | 1 | 1 | 1 | 0 |
| 1 | 1 | 1 | 0 | 1 | 1 | 0 |
| 1 | 1 | 1 | 1 | 0 | 0 | 0 |
| 1 | 1 | 1 | 1 | 1 | 1 | 0 |
| 1 | 1 | 1 | 1 | 1 | 0 | 0 |
| 1 | 1 | 1 | 0 | 1 | 1 | 0; |

(b) sending a second distinct pattern to the receiver site from the remote location, said second pattern being comprised of nineteen digitally encoded seven bit samples.

30. A method as recited in claim 29 wherein the second distinct pattern comprises:

| | | | | | | |
|---|---|---|---|---|---|---|
| 1 | 1 | 0 | 0 | 1 | 1 | 1 |
| 1 | 1 | 1 | 0 | 1 | 1 | 1 |
| 1 | 1 | 0 | 0 | 1 | 1 | 1 |
| 0 | 1 | 1 | 0 | 1 | 1 | 1 |
| 1 | 1 | 0 | 0 | 1 | 1 | 1 |
| 1 | 1 | 1 | 0 | 1 | 1 | 1 |
| 1 | 0 | 0 | 0 | 1 | 1 | 1 |
| 0 | 1 | 1 | 0 | 1 | 1 | 1 |
| 1 | 1 | 1 | 0 | 1 | 1 | 1 |
| 1 | 1 | 1 | 0 | 1 | 1 | 1 |
| 1 | 0 | 0 | 0 | 1 | 1 | 1 |
| 1 | 0 | 0 | 0 | 1 | 1 | 1 |
| 1 | 1 | 1 | 0 | 1 | 1 | 1 |
| 1 | 1 | 1 | 0 | 1 | 1 | 1 |
| 0 | 1 | 1 | 0 | 1 | 1 | 1 |
| 1 | 0 | 0 | 0 | 1 | 1 | 1 |
| 1 | 1 | 1 | 0 | 1 | 1 | 1 |
| 1 | 1 | 0 | 0 | 1 | 1 | 1 |
| 0 | 1 | 1 | 0 | 1 | 1 | 1. |

31. A method as recited in claim 29 wherein the second distinct pattern comprises:

| | | | | | | |
|---|---|---|---|---|---|---|
| 1 | 0 | 0 | 1 | 1 | 1 | 1 |
| 1 | 1 | 0 | 1 | 1 | 1 | 1 |
| 1 | 0 | 0 | 1 | 1 | 1 | 0 |
| 1 | 1 | 0 | 1 | 1 | 1 | 1 |
| 1 | 0 | 0 | 1 | 1 | 1 | 1 |
| 1 | 1 | 0 | 1 | 1 | 1 | 1 |
| 0 | 0 | 0 | 1 | 1 | 1 | 0 |
| 1 | 1 | 0 | 1 | 1 | 1 | 1 |
| 1 | 1 | 0 | 1 | 1 | 1 | 1 |
| 0 | 0 | 0 | 1 | 1 | 1 | 1 |
| 1 | 1 | 0 | 1 | 1 | 1 | 1 |
| 1 | 1 | 0 | 1 | 1 | 1 | 0 |
| 1 | 0 | 0 | 1 | 1 | 1 | 1 |
| 1 | 1 | 0 | 1 | 1 | 1 | 1 |
| 1 | 1 | 0 | 1 | 1 | 1 | 0 |
| 1 | 1 | 0 | 1 | 1 | 1 | 1. |

32. A method of disabling an echo canceler located in a receiver site in which bytes are framed from an asychronous remote site, comprising sending a pattern of digitally encoded samples of a tone comprised of repetitions of the following nineteen seven bit digital samplers of an analog waveform:

| | | | | | | |
|---|---|---|---|---|---|---|
| 1 | 0 | 1 | 0 | 1 | 0 | 1 |
| 1 | 0 | 1 | 0 | 1 | 0 | 1 |
| 0 | 1 | 0 | 1 | 0 | 1 | 0 |
| 0 | 1 | 0 | 1 | 0 | 1 | 0 |
| 1 | 0 | 1 | 0 | 1 | 0 | 1 |
| 1 | 0 | 1 | 0 | 1 | 0 | 1 |
| 0 | 1 | 0 | 1 | 0 | 1 | 0 |
| 0 | 1 | 0 | 1 | 0 | 1 | 0 |
| 1 | 0 | 1 | 0 | 1 | 0 | 1 |
| 1 | 0 | 1 | 0 | 1 | 0 | 1 |
| 0 | 1 | 0 | 1 | 0 | 1 | 0 |
| 0 | 1 | 0 | 1 | 0 | 1 | 0 |
| 1 | 0 | 1 | 0 | 1 | 0 | 1 |
| 1 | 0 | 1 | 0 | 1 | 0 | 1 |
| 0 | 1 | 0 | 1 | 0 | 1 | 0 |
| 0 | 1 | 0 | 1 | 0 | 1 | 0 |
| 1 | 0 | 1 | 0 | 1 | 0 | 1 |
| 1 | 0 | 1 | 0 | 1 | 0 | 1 |
| 0 | 1 | 0 | 1 | 0 | 1 | 0. |

33. A method of formatting a digital signal that disables an echo canceler, said signal being sent from an unframed environment to a framed environment in which the echo canceler resides so that the signal disables the echo canceler no matter how frames, comprising selecting bit patterns of samples of a single tone that comprise the signal so that no matter how frames in the framed environment, the sign bits of the digital samples are arranged in an alternative sequence of pairs of like sign bits for a significant portion of the samples.

34. A method as recited in claim 33 further comprising the step of adjusting bits in the signal to compensate for weightings given different frequencies by a disabling circuit in the echo canceler.

35. A method of disabling an echo canceler located in a receiver site in which each byte is framed in any of N possible framings, such that said echo canceler is disables by a tone sent from an asynchornous remote site have energy content at a predetermined frequency, comprising sending less than N bit shifted rotations of a given tone to the echo canceler for the asychronous remote site wherein the tone that disables the echo canceler is one of the rotations of the given signal that is sent.

36. A method of disabling an echo canceler apparatus, located in a receiver site in which bytes are framed, such that said echo canceler apparatus is disabled by a digitized signal sent from a remote site having energy content at a predetermined frequency, comprising the step of sending a first signal comprising a first version of a sequence of bits divided into bytes, each byte consisting of n-bits, where n is an integer greater than 3,to the receiver site for the remote site and also sending less than n bit-shifted versions of said first signal, at least one of the versions, regardless of how framed, will have sufficient energy to disable the echo canceler at the receiver site.

* * * * *

UNITED STATES PATENT AND TRADEMARK OFFICE
CERTIFICATE OF CORRECTION

PATENT NO. : 5,014,307

DATED : May 7, 1991

INVENTOR(S) : Daniel M. Joffe and Charles R. Eberle, Jr.

It is certified that error appears in the above-identified patent and that said Letters Patent is hereby corrected as shown below:

Col. 12, line 63, delete "locate din" and insert ---located in---.

Col. 13, line 37, delete "frames" and insert ---framed---.

Col. 13, line 50, delete "pattern" and insert ---signal---.

Col. 13, line 51, delete "frames" and insert ---framed---.

Col. 13, line 57, delete "represents" and insert ---represent---.

Col. 14, line 1, delete "distance" and insert ---distinct---.

Col. 14, line 10, after "bits" delete "i" and insert ---in---.

Col. 14, line 14, after "noise" delete ---a---.

Col. 14, line 61, delete "/".

Col. 15, line 32, after ";" insert ---and---.

Col. 16, line 14, delete "samplers" and insert ---samples---.

Col. 16, line 37, delete "frames" and insert ---framed---.

Col. 16, line 39, delete "frames" and insert ---framed---.

Col. 16, line 48 continued on line 49, delete "disables" and insert ---disabled---.

Col. 16, line 49, delete "asynchornous" and insert ---asynchronous---.

Col. 16, line 50, delete "have" and insert ---having---.

UNITED STATES PATENT AND TRADEMARK OFFICE
CERTIFICATE OF CORRECTION

PATENT NO. : 5,014,307

DATED : May 7, 1991

INVENTOR(S) : Daniel M. Joffe and Charles R. Eberle, Jr.

It is certified that error appears in the above-identified patent and that said Letters Patent is hereby corrected as shown below:

Col. 16, line 63, delete "for" and insert ---from---.

Signed and Sealed this

Twentieth Day of October, 1992

Attest:

DOUGLAS B. COMER

Attesting Officer

Acting Commissioner of Patents and Trademarks